(12) United States Patent
Watanabe et al.

(10) Patent No.: US 7,083,726 B2
(45) Date of Patent: Aug. 1, 2006

(54) HOLLOW THREAD FILM CARTRIDGE, HOLLOW THREAD FILM MODULE USING THE CARTRIDGE, AND TANK TYPE FILTER

(75) Inventors: Akihiro Watanabe, Tokyo (JP); Yuzuru Ishibashi, Fuji (JP); Katsuhiko Hamanaka, Fuji (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 56 days.

(21) Appl. No.: 10/332,453

(22) PCT Filed: Jul. 10, 2001

(86) PCT No.: PCT/JP01/05972

§ 371 (c)(1),
(2), (4) Date: Jan. 9, 2003

(87) PCT Pub. No.: WO02/04101

PCT Pub. Date: Jan. 17, 2002

(65) Prior Publication Data

US 2004/0045893 A1    Mar. 11, 2004

(30) Foreign Application Priority Data

Jul. 10, 2000 (JP) ............................. 2000-208339
Mar. 6, 2001 (JP) ............................. 2001-062532

(51) Int. Cl.
*B01D 63/00* (2006.01)
*B01D 63/04* (2006.01)

(52) U.S. Cl. .................... 210/321.67; 210/321.69; 210/500.23; 210/321.78; 210/321.79

(58) Field of Classification Search .......... 210/321.67, 210/321.69, 500.23, 321.78, 321.79, 321.8, 210/321.88, 321.89, 323.2
See application file for complete search history.

(56) References Cited

U.S. PATENT DOCUMENTS

| | | | |
|---|---|---|---|
| 4,002,567 A * | 1/1977 | Konno et al. ........... | 210/333.01 |
| 4,775,471 A | 10/1988 | Nagai et al. | |
| 5,209,852 A * | 5/1993 | Sunaoka et al. ............ | 210/636 |
| 5,525,220 A | 6/1996 | Yagi et al. | |
| 5,944,997 A * | 8/1999 | Pedersen et al. ............ | 210/636 |
| 6,149,817 A * | 11/2000 | Peterson et al. ............ | 210/644 |
| 6,156,200 A * | 12/2000 | Zha et al. .............. | 210/321.89 |
| 6,322,703 B1 * | 11/2001 | Taniguchi et al. .......... | 210/636 |

FOREIGN PATENT DOCUMENTS

| | | |
|---|---|---|
| CA | 2318618 | 6/2000 |
| EP | 1088792 A1 | 4/2001 |
| JP | 61-153104 A | 7/1986 |
| JP | 3-98622 A | 4/1991 |
| JP | 10-137552 A | 5/1998 |
| JP | 11-90187 A | 4/1999 |
| JP | 2000-157846 A | 6/2000 |
| JP | 1 052 012 A1 | 11/2000 |
| WO | WO 98/28066 A1 | 7/1998 |
| WO | WO00/30740 A1 | 6/2000 |

* cited by examiner

*Primary Examiner*—W. L. Walker
*Assistant Examiner*—K S Menon
(74) *Attorney, Agent, or Firm*—Birch, Stewart, Kolasch & Birch, LLP

(57) ABSTRACT

A hollow fiber membrane cartridge wherein a cartridge head and a bottom ring are connected and fixed to each other by means of a plurality of rods or pipes, the hollow portion at the end of each hollow fiber membrane on the cartridge head side is open, the hollow portion at the end of each hollow fiber membrane on the bottom ring side is sealed, and a plurality of through-holes are provided in an adhesion and fixation layer on the bottom ring side and are located in a bundle of the hollow fiber membranes.

13 Claims, 8 Drawing Sheets

HOLLOW THREAD FILM CARTRIDGE, HOLLOW THREAD FILM MODULE USING THE CARTRIDGE, AND TANK TYPE FILTER

This application is the national phase under 35 U.S.C. § 371 of PCT International Application No. PCT/JP01/05972 which has an International filing date of Jul. 10, 2001, which designated the United States of America.

TECHNICAL FIELD

The present invention relates to a filtration cartridge using hollow fiber membranes which is set in a tank type filtration apparatus, a rack type filtration apparatus or an immersion type filtration apparatus, in which filtration is carried out under pressure or by suction. More particularly, the present invention relates to a hollow fiber membrane cartridge used in a filtration apparatus for removing turbidity and bacteria from a large volume of raw water such as river water, lake water, underground water, sea water, life waste water or industrial waste water or a filtration apparatus for solid-liquid separation in activated-sludge treatment; and a module for rack type filtration apparatus, or a tank type filtration apparatus, which uses said hollow fiber membrane cartridge.

BACKGROUND ART

JP-A-61-153104 discloses, as a conventional cartridge using hollow fiber membranes, a cartridge having the following structure: a plurality of hollow fiber membranes are accommodated in a cylindrical casing, both ends of each hollow fiber membrane are fixed to the cylindrical casing in the upper and lower adhesion and fixation portions, respectively, and the cylindrical casing is a casing integrally molded so as to extend to the upper and lower ends of the hollow fiber membranes. The hollow portions of a large number of the hollow fiber membranes are open in the upper adhesion and fixation portion of the cartridge but are sealed in the lower adhesion and fixation portion, and an adhesive layer in the lower adhesion and fixation portion has a plurality of through-holes. A gas chamber surrounded by the cylindrical casing is formed under the lower adhesion and fixation portion.

This hollow fiber membrane cartridge is for filtration under external pressure and is used after being set in a filtration column. When materials to be filtered are accumulated on the outer surfaces of the membranes, the filtering capability of the membranes is diminished, and therefore a washing procedure for removing the accumulated materials on the surfaces of the membranes is carried out after filtration for a definite time.

For this washing procedure, a method called gas bubbling is adopted which comprises introducing a gas into the hollow fiber membrane cartridge through its lower portion in a filtration column filled with raw water, and vibrating the hollow fiber membranes in a gas-liquid mixed fluid to peel off the accumulated materials on the surfaces of the membranes.

However, in the hollow fiber membrane cartridge, gas bubbling has insufficient washing effect in some cases because both ends of each hollow fiber membrane are fixed to the cylindrical casing, so that the extension and vibration of the hollow fiber membranes are limited. This phenomenon is remarkable and causes troubles in a long-term filtration operation, particularly when the diameter of the cartridge is large.

On the other hand, JP-A-2000-157846 has proposed a hollow fiber membrane cartridge comprising a cartridge head and a bottom ring to which the end of a bundle of hollow fiber membranes is adhered and fixed, wherein the cartridge head and the bottom ring are not connected and fixed to each other, and a plurality of through-holes for gas introduction are provided in the adhesion and fixation layer of the bottom ring. This hollow fiber membrane cartridge has no cylindrical casing and hence is advantageous in that the extension and vibration of the hollow fiber membranes are not limited during gas bubbling, so that it is easy to peel off suspended materials accumulated on the surfaces of the membranes and to discharge the suspended materials peeled off, from the cartridge.

However, in this hollow fiber membrane cartridge, the feed rate of a gas must be limited in order to prevent the bundle of the hollow fiber membranes from bending due to the lift of the bottom ring during the gas bubbling. On the other hand, when the gas bubbling is repeatedly conducted for a long period of time by the use of a large volume of a gas in order to obtain a sufficient washing effect, the bundle of the hollow fiber membranes is repeatedly bent, so that the hollow fiber membranes are cut in some cases. Therefore, in either case, a long-term filtration operation is difficult to carry out stably.

JP-A-10-137552 discloses a cartridge in which an upper adhesion and fixation layer and a lower adhesion and fixation layer are connected to each other by locating a supporting column in the center of a bundle of membranes. This cartridge makes it possible to avoid the buckling of the bundle of hollow fiber membranes during gas bubbling by the location of the supporting column in the center but involves the following problems: insufficient washing effect is obtained because of the low efficiency of contact between bubbles and the hollow fiber membranes, the cartridge has insufficient resistance to a torsion produced during handling or gas bubbling, and the cartridge is difficult to handle because its upper and/or lower adhesion and fixation portion should be held when the cartridge is carried.

In addition, WO98/28066 discloses a cartridge obtained by surrounding the periphery of a bundle of membranes with a perforated cage-like member. This cartridge is disadvantageous in that since only a small washing effect can be obtained therein because the vibration of the hollow fiber membranes during gas bubbling is limited, a large volume of gas needs to be introduced thereinto in order to obtain a sufficient washing effect.

DISCLOSURE OF THE INVENTION

The present invention is intended to provide a hollow fiber membrane cartridge which makes it easy to peel off suspended materials accumulated on the outer surfaces of hollow fiber membranes, by the introduction of a small volume of a gas by extending and/or vibrating each hollow fiber membrane as much as possible at the time of washing by gas bubbling, permits easy discharge of the peeled-off suspended materials from the hollow fiber membrane cartridge, and makes it possible to carry out a long-term stable filtration operation; and to provide a module for filtration apparatus or a filtration apparatus, which uses said hollow fiber membrane cartridge.

The present inventors earnestly investigated in order to solve the problems described above, and consequently found that a cartridge obtained by connecting and fixing a cartridge head and a bottom ring to each other by means of a plurality of rods or pipes is suitable for the above purpose, and that employment of hollow fiber membranes having a specific modulus in tension makes it possible to obtain a sufficient washing effect by using a small volume of a gas. On the basis of this finding, the present invention has been accomplished.

That is, the present invention is as follows.

(1) A hollow fiber membrane cartridge comprising a bundle of a plurality of hollow fiber membranes, both ends of which are fixed by adhesion in adhesion and fixation layers, respectively, a cartridge head fixed at the periphery of the bundle at one end so as not to permit the passage of liquid either in or out, and a bottom ring fixed at the periphery of the bundle at the other end so as not to permit the passage of liquid either in or out, which is characterized in that said cartridge head and said bottom ring are connected and fixed to a plurality of rods or pipes, the hollow portion at the end of each hollow fiber membrane on the cartridge head side is open, the hollow portion at the end of each hollow fiber membrane on the bottom ring side is sealed, and a plurality of through-holes are provided in the adhesion and fixation layer on the bottom ring side and are located in the bundle of the hollow fiber membranes.

(2) A hollow fiber membrane cartridge according to the above item (1), wherein the end of said bottom ring juts out beyond the ends of the hollow fiber membranes.

(3) A hollow fiber membrane cartridge according to the above item (1) or (2), wherein said cartridge head has a collar at its periphery.

(4) A hollow fiber membrane cartridge according to any one of the above items (1) to (3), wherein said rods or pipes are located near the periphery of the bundle of the hollow fiber membranes.

(5) A hollow fiber membrane cartridge according to the above item (4), wherein said rods or pipes are connected and fixed to said cartridge head and said bottom ring by adhesion to them together with the hollow fiber membranes in the adhesion and fixation layers.

(6) A hollow fiber membrane cartridge according to any one of the above items (1) to (5), wherein the hollow fiber membranes have waves.

(7) A hollow fiber membrane cartridge according to any one of the above items (1) to (6), wherein the modulus in tension of the hollow fiber membrane is less than 90 MPa and not less than 10 MPa.

(8) A hollow fiber membrane cartridge according to the above item (7), wherein the modulus in tension of the hollow fiber membrane is not more than 70 MPa and not less than 10 MPa.

(9) A hollow fiber membrane cartridge according to any one of the above items (1) to (8), wherein the hollow fiber membranes are in a slacked state and the rate of slacking is not more than 10% and not less than 0.1%.

(10) A hollow fiber membrane cartridge according to any one of the above items (1) to (9), wherein said plurality of through-holes provided in the adhesion and fixation layer on the bottom ring side are located so that the hollow fiber membranes are present among the through-holes.

(11) A hollow fiber membrane cartridge according to any one of the above items (1) to (10), wherein said plurality of through-holes provided in the adhesion and fixation layer on the bottom ring side have an inside diameter of 2 to 30 mm.

(12) A hollow fiber membrane cartridge according to any one of the above items (1) to (11), wherein an adhesive constituting said adhesion and fixation layers is a urethane resin having such a characteristic that its hardness is 70D to 30D in a working temperature range.

(13) A module for rack type filtration apparatus using a hollow fiber membrane cartridge according to any one of the above items (1) to (12).

(14) A tank type filtration apparatus using a hollow fiber membrane cartridge according to any one of the above items (1) to (12).

(15) A tank type filtration apparatus according to the above item (14), wherein said hollow fiber membrane cartridge is supported in a suspended state.

BEST MODE FOR CARRYING OUT THE INVENTION

Embodiments of the present invention are concretely explained below with reference to the drawings.

Figure 1:
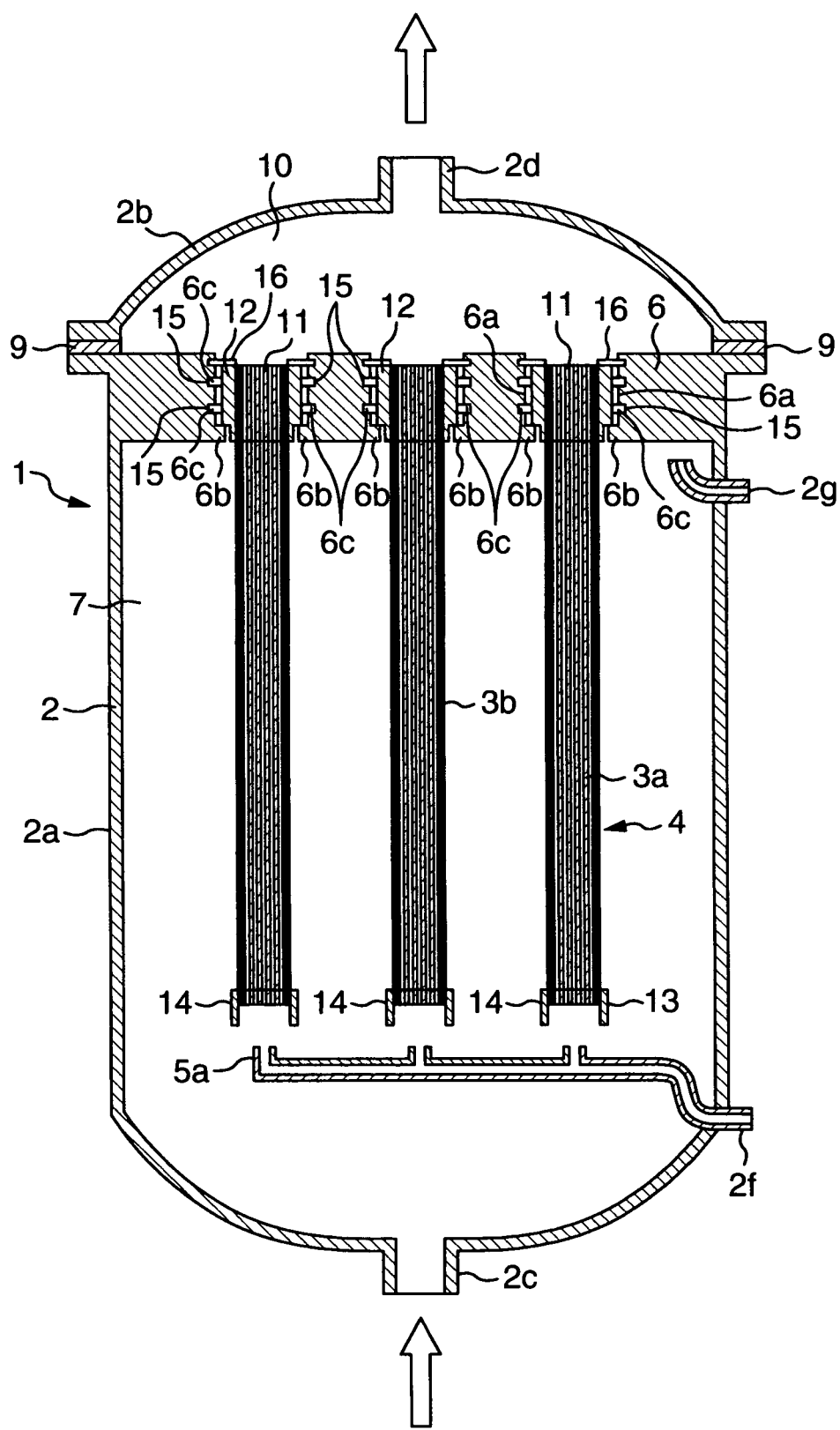
FIG. 1 is a sectional illustration showing one embodiment of the hollow fiber membrane cartridge of the present invention supported in a suspended state in a tank type filtration apparatus.
Figure 2:
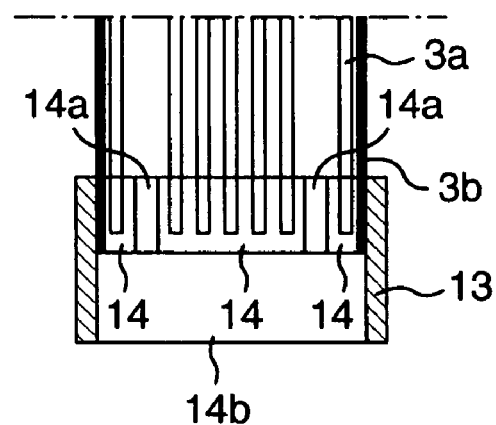
FIG. 2 is an enlarged view of the principal part showing the structure of the bottom ring adhesion and fixation portion of the hollow fiber membrane cartridge shown in FIG. 1.
Figure 6:
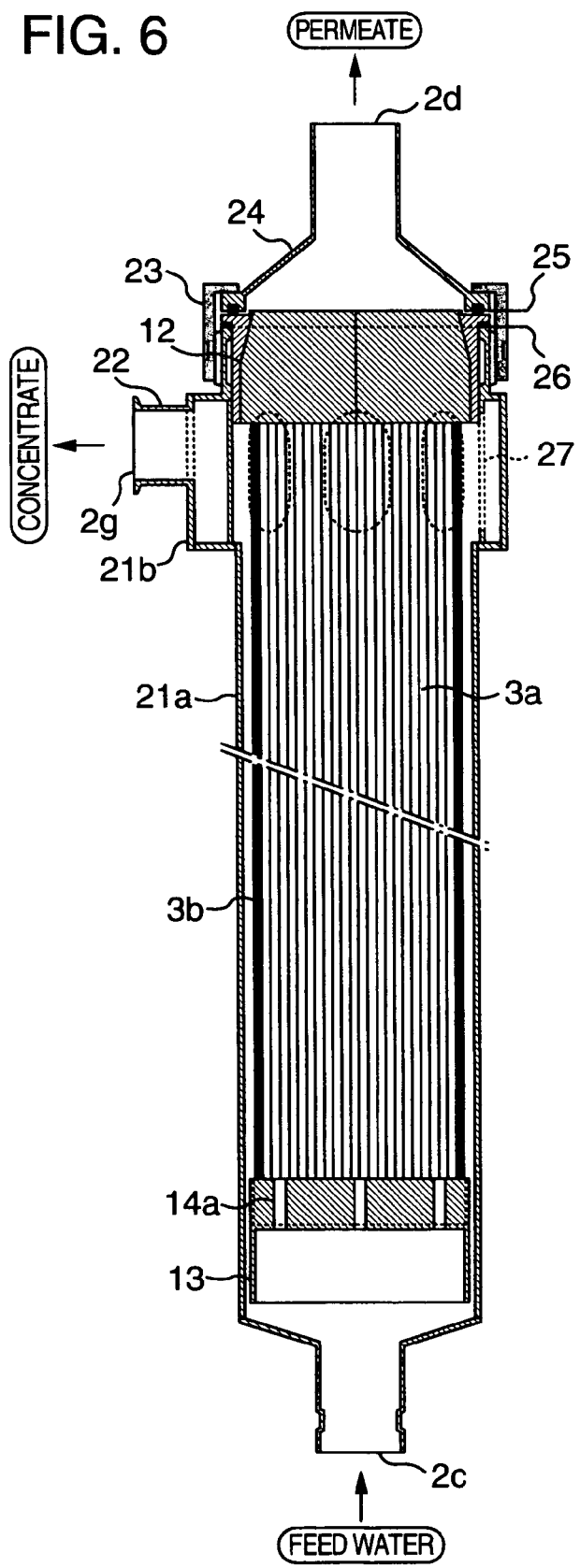
FIG. 6 is a sectional illustration showing one embodiment of a module used in a rack type filtration apparatus, namely, a module obtained by accommodating the hollow fiber membrane cartridge of the present invention in the housing shown in FIG. 5.
Figure 7:
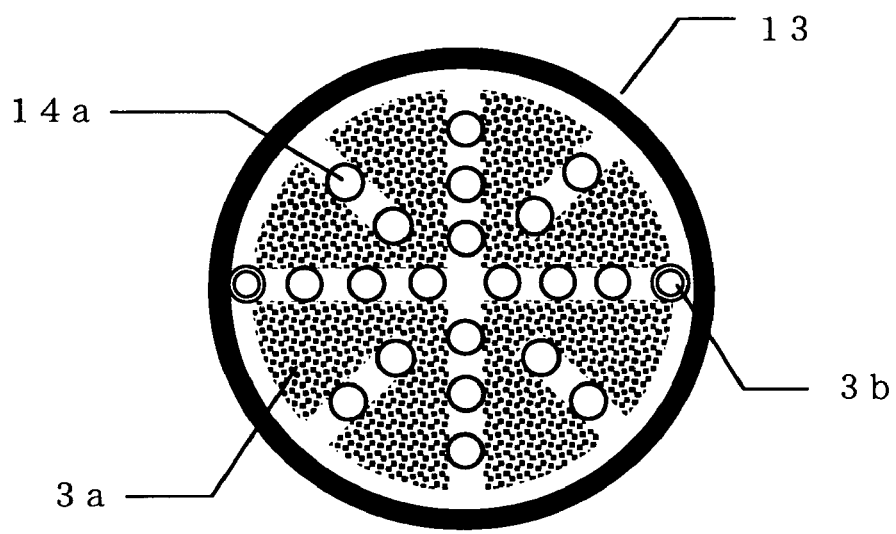
FIG. 7 is a sectional illustration showing one example of the location of through-holes in the bottom ring adhesion and fixation portion of the hollow fiber membrane cartridge.
Figure 8:
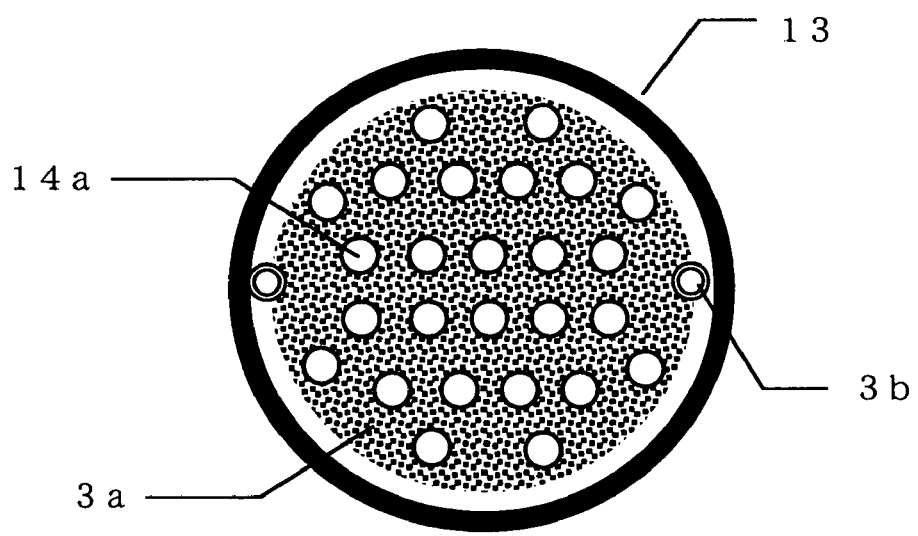
FIG. 8 is a sectional illustration showing another example of the location of through-holes in the bottom ring adhesion and fixation portion of the hollow fiber membrane cartridge.
Figure 9:
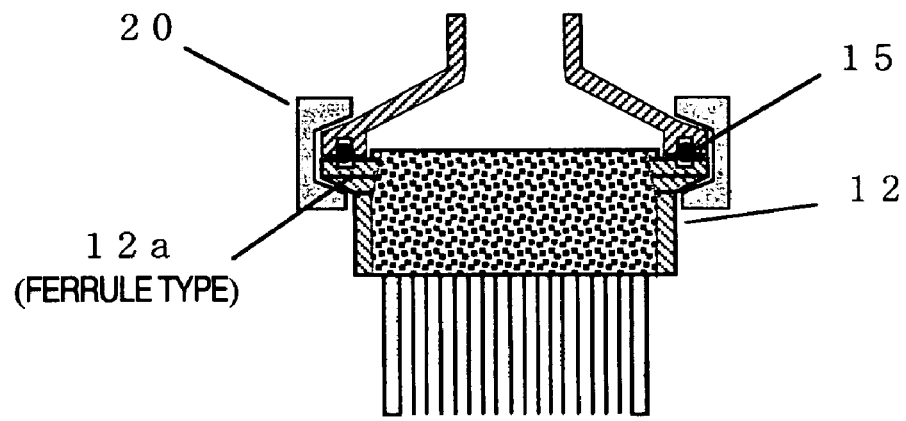
FIG. 9 is an enlarged illustration of the principal part showing one embodiment of the connection of a cartridge header to the piping of an apparatus in FIG. 4.
Figure 10:
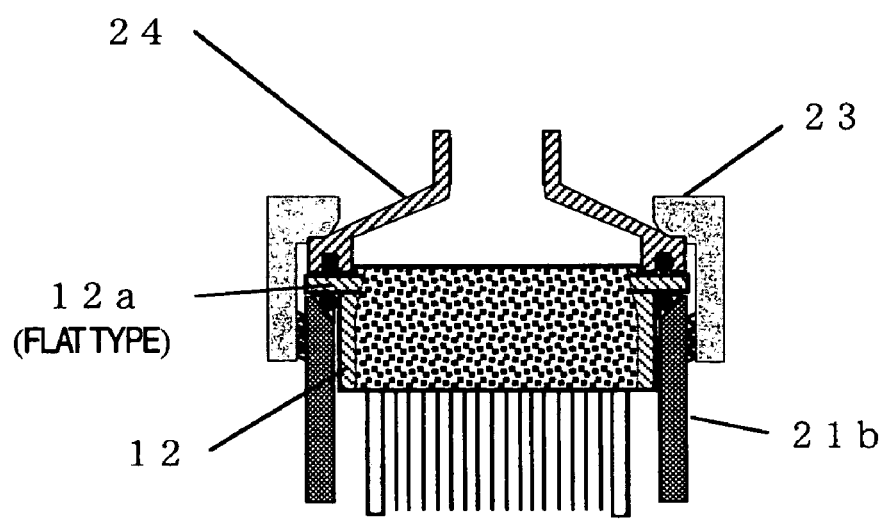
FIG. 10 is an enlarged illustration of the principal part showing one embodiment of the connection of a cartridge header in the case of FIG. 8 to the piping of an apparatus.
Figure 11:
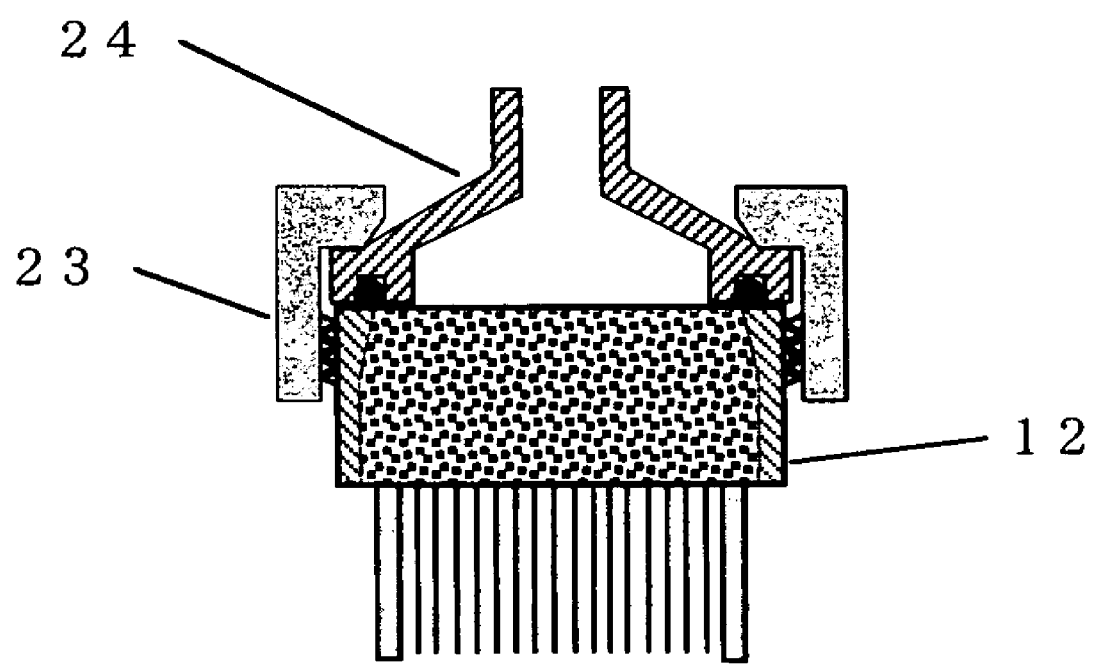
FIG. 11 is an enlarged illustration of the principal part showing one embodiment of the connection of a cartridge header to the piping of an apparatus used in immersion type filtration carried out by direct immersion in raw water followed by filtration by suction.

FIG. 1 is a sectional illustration showing one embodiment of the hollow fiber membrane cartridge of the present invention supported in a suspended state in a tank type filtration apparatus. FIG. 2, FIG. 7 and FIG. 8 are illustrations for explaining the structure of the bottom ring adhesion and fixation portion of the hollow fiber membrane cartridge. FIG. 6 is a sectional illustration showing one embodiment of the hollow fiber membrane cartridge in a module used in a rack type filtration apparatus. FIGS. 9 to 11 are sectional illustrations showing embodiments of the connection of a cartridge header to the piping of an apparatus.

The hollow fiber membrane cartridge 4 of the present invention is composed of a large number of hollow fiber membranes 3a, connecting pipes 3b, an adhesion and fixation layer 11, a cartridge head 12, an adhesion and fixation layer 14 and a bottom ring 13.

At one end of a bundle of the hollow fiber membranes 3a and one end of each connecting pipe 3b, the hollow fiber membranes are integrally bonded to one another with an adhesive and are integrally attached to the inside of the cartridge head 12 to form the adhesion and fixation layer 11. The ends of the hollow fiber membranes 3a on the cartridge head 12 side are open.

At the other end of the bundle of the hollow fiber membranes 3a and the other end of each connecting pipe 3b, the hollow fiber membranes are integrally bonded to one another with an adhesive and are integrally attached to the inside of the bottom ring 13 to form the adhesion and fixation layer 14. The ends of the hollow fiber membranes 3a on the bottom ring 13 side are sealed. As shown in FIG. 2, a plurality of through-holes 14a are formed in the adhesion and fixation layer 14 in order to introduce raw water or a gas for washing into the bundle of the hollow fiber membranes and bring the raw water or the gas effectively into contact with the outer surface of each hollow fiber membrane.

The diameter of the hollow fiber membrane cartridge 4 is 30 mm to 800 mm, preferably 80 mm to 800 mm. The length of the hollow fiber membrane cartridge 4 ranges preferably from 300 mm to 3,000 mm.

Figure 3:
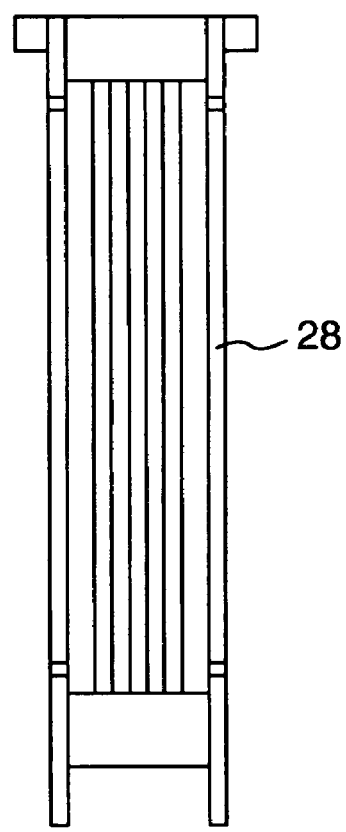
FIG. 3 is a schematic illustration of the known hollow fiber membrane cartridge.

In the present invention, the cartridge head 12 and the bottom ring 13 are connected and fixed to each other by means of two or more rods or pipes. A cylindrical casing 28 such as that of the conventional cartridge shown in FIG. 3 is not present at the periphery of the bundle of the hollow fiber membranes 3a between the cartridge head 12 and the bottom ring 13, and substantially throughout this range, the hollow fiber membranes are exposed. Although a method for connecting the cartridge head and the bottom ring to each other by the plurality of the rods or pipes is not particularly limited, the rods or pipes are preferably fixed by embedding the rods or pipes in the adhesion and fixation layers as described above.

When the cartridge head 12 and the bottom ring 13 are not connected and fixed to each other, increasing the flow rate of a gas or water in washing by gas bubbling or flushing lifts the bottom ring to bend the bundle of the hollow fiber membranes, when the flow rate exceeds a definite rate, though the definite rate is dependent on the strength of the hollow fiber membranes, the number of the hollow fiber membranes and the length of the hollow fiber membranes.

When only one rod or pipe is used for the connection and fixation, a stress is centered at one point and moreover, the cartridge is insufficient in resistance to bending or twisting in the lateral direction. This phenomenon is remarkable and causes troubles in a long-term filtration operation, particularly when the diameter of the cartridge is large.

As to the size of the rods or pipes for the connection and fixation, the equivalent diameter of the rods or pipes ranges from 2 mm to 30 mm. Here, the equivalent diameter is defined as 4×(sectional area of flow path)/(circumference). The shape of the cross-section of the rods or pipes for the connection and fixation is selected from polygons (e.g. triangle, tetragon and hexagon), a round shape, an oval shape, a fan shape, a C shape, a star shape, etc. The rods or pipes preferably have in particular a round shape of cross-section. The number of the rods or pipes is 2 to 30 though it is dependent on the sectional area of the cartridge and the number of fibers.

Although the size and number of the rods or pipes should be determined so that the rods or pipes can withstand a mechanical load applied at the time of use or handling, they are preferably minimized as much as possible because when the size or number determined is excessive, the rods or pipes occupy a large area, resulting in a small membrane area per unit area. For the minimization, the location of the plurality of the rods or pipes is an important factor. That is, the rods or pipes are preferably located so that they can uniformly receive a force applied from below during gas bubbling or flushing. For example, the rods or pipes are preferably located at regular intervals at the periphery of the bundle of fibers or located so as to be dispersed in the bundle of fibers. Particularly when the rods or pipes are located in the vicinity of the periphery of the bundle of fibers, the cartridge can be handled by holding the rods or pipes, so that the handleability is markedly improved. Furthermore, a sufficient mechanical strength against buckling and torsion can be assured even if the rods or pipes occupy only a small area. Therefore, it is especially preferable to locate the rods or pipes in the vicinity of the periphery of the bundle of fibers. The term "the vicinity of the periphery" used here means an inner portion of the bundle of fibers which extends over a distance of one-fourth the diameter of the bundle of fibers from the periphery surface of the bundle of fibers.

For fixing the rods or pipes for the connection and fixation to the adhesion layer 11 on the cartridge header side and the adhesion layer 14 on the bottom ring side, the following methods, for example, can be adopted: a method of fixing the rods or pipes with an adhesive together with the bundle of the hollow fiber membranes; a method of previously making holes in the cartridge header and the bottom ring in order to insert the rods or pipes for the connection and fixation into the holes, inserting the rods or pipes for the connection and fixation into the holes, and adhering and fixing the rods or pipes together with the bundle of the hollow fiber membranes; and a method of fixing the rods or pipes at the peripheries of the cartridge header and the bottom ring. The methods of adhering and fixing the rods or pipes to the adhesion and fixation layers together with the hollow fiber membranes are suitable.

As the hollow fiber membrane 3a used in the present invention, reverse osmosis membranes, nano-filtration membranes, ultrafiltration membranes and microfiltration membranes can be used from the viewpoint of pore size.

A flexible hollow fiber membrane is preferably chosen as the hollow fiber membrane 3a because it brings about a sufficient washing effect even at a relatively small volume of a gas. Specifically, the modulus in tension of the hollow fiber membrane is preferably less than 90 MPa and not less than 10 MPa, more preferably not more than 70 MPa and not less than 10 MPa, still more preferably not more than 60 MPa and not less than 10 MPa. The modulus in tension is a value obtained by using the following measuring method and is a value measured for the membrane in use, namely, the membrane in a wet state. In detail, the modulus in tension was determined by pulling the membrane with a tensile tester under conditions of a distance between chucks of 50 mm and a rate of pulling of 200 mm/min, determining a load at an elongation of 100% by extrapolation from a load at an elongation of 0.1% and a load at an elongation of 5%, and dividing the load at an elongation of 100% by the sectional area of the hollow fiber membrane.

A material for the hollow fiber membrane 3a is not particularly limited and includes polysulfones, polyether sulfones, polyacrylonitriles, polyimides, polyether imides, polyamides, polyether ketones, polyether ether ketones, polyethylenes, polypropylenes, poly(4-methylpentene)s, ethylene-vinyl alcohol copolymers, celluloses, cellulose acetates, poly(vinylidene fluoride)s, ethylene-tetrafluoroethylene copolymers, polytetrafluoroethylenes, etc. Composite materials thereof can also be used. Of the above-exemplified materials, the polyethylenes, poly-propylenes, ethylene-vinyl alcohol copolymers, celluloses, poly(vinylidene fluoride)s and the like are preferable because they can easily give a membrane having a modulus of tension in the above range.

As to the shape of the hollow fiber membrane, hollow fiber membranes having an inside diameter of 50 μm to 3,000 μm, preferably 500 μm to 2,000 μm, and a ratio of inside diameter to outside diameter of 0.3 to 0.8 are suitably used.

In addition, the hollow fiber membrane preferably has waves. When accumulated materials adhering to the outer surfaces of the hollow fiber membranes are washed away by gas bubbling, the surfaces of the hollow fiber membranes are rubbed by contact between the hollow fiber membranes or contact of the hollow fiber membranes with the inner wall surface of a housing, so that the water permeability is deteriorated in some cases. When the hollow fiber membrane has waves, the contact area can be reduced, so that the deterioration of the water permeability by the rubbing can be markedly reduced. Furthermore, when the hollow fiber membrane has waves, the waves exhibit such an effect that the accumulated materials washed away from the surfaces of the membranes are easy to discharge from the bundle of the membranes.

The manner of the waving, i.e., the degree of the waving is expressed in terms of the degree of crimping of the bundle of the hollow fiber membranes. The degree of crimping is preferably less than 2.5 and not less than 1.5. When the degree of crimping is less than 1.5, the suppression of the rubbing phenomenon and the discharge of the accumulated materials are not sufficient. When the degree of crimping is not less than 2.5, there arise disadvantages, for example, in that the outside diameter of the bundle is increased, resulting in an increased size of the adhesion and fixation portions of the cartridge. The term "degree of crimping" used here means a value obtained by bundling 1,000 hollow fiber membranes to put them in order, winding a PET film with a thickness of 200 μm and a width of 40 mm having a spring balance attached to the end of the film, around the bundle of the hollow fiber membranes, measuring the circumference of the bundle of the hollow fiber membranes while applying a load of 1 kg by pulling the spring balance, and calculating the value by the following equation:

$$\text{Degree of crimping} = (\text{circumference } [m]/\Pi)^2 / ((\text{outside diameter of hollow fiber membrane } [m])^2 \times \text{number of hollow fiber memberanes})$$

In the cartridge of the present invention, the hollow fiber membranes are preferably fixed in a somewhat slacked state. The slacked state is expressed in terms of the rate of slacking described below. The rate of slacking is preferably 0.1 to 10%, in particular, 1 to 5%. When the rate of slacking is less than 0.1%, the vibration of the hollow fibers during gas bubbling is limited, so that the tendency of the membrane surface washing effect to diminish is strengthened. When the rate of slacking is more than 10%, the distance between the hollow fiber membranes is uselessly increased, and hence the efficiency of contact with bubbles is decreased, so that the membrane surface washing effect tends to be lessened.

The term "rate of slacking" means a percentage obtained by measuring the deflection distance L2 of the bundle of the hollow fiber membranes in a water-containing state which is due to the weight of the bundle itself, while keeping the cartridge horizontal, and dividing L2 by the distance L1 between the adhesive interfaces (the surfaces on the cartridge center side) of the cartridge header and the bottom ring, respectively, which are fixed by means of the rods or pipes. The rate of slacking is represented by the following equation:

$$\text{Rate of slacking} = (L2/L1) \times 100$$

As the adhesive used in the present invention, polymeric materials such as epoxy resins, urethane resins, epoxyacrylate resins, silicone resins and the like are preferable. Of these, the urethane resins are especially preferable because their reaction goes to completion in a relatively short time. In the cartridge head fixed by the use of such an adhesive, the adhesion and fixation portion should have such a pressure resistance that the adhesion and fixation portion can withstand a differential pressure produced during use. For this purpose, the adhesive preferably has a proper hardness. On the other hand, the hollow fiber membranes are broken in some cases at the adhesive interfaces of the membranes by vibration during gas bubbling. This membrane breakage can be prevented by using an adhesive having a proper softness. Therefore, in order to impart a necessary and sufficient pressure resistance for use and prevent the membrane breakage, it is preferable to use an adhesive having such a characteristic that it has a hardness of 30D to 70D in a working temperature range. The term "hardness" used here means a value measured 10 seconds after pressing a Shore hardness meter against the substantially smooth surface of a sample. When this value is more than 70D, the tendency of the membrane breakage to take place at the adhesive interface with the hollow fiber membranes is strengthened. When the value is less than 30D, the pressure resistance is not sufficient, so that the adhesion and fixation portion is damaged causing leakage, in some cases.

As a method for the adhesion, well-known methods such as centrifugal adhesion method, still-standing adhesion method and the like are adopted. When the curing shrinkage and strength of the adhesive are desired to be improved, a fibrous material such as glass fiber or carbon fiber, or fine powder of carbon black, alumina, silica or the like may be incorporated into the above-exemplified adhesive.

Materials for the cartridge head 12, the bottom ring 13 and the connecting rods or pipes 3b which are used in the present invention are not particularly limited and may be the same or different. Thermoplastic resins, stainless steel and composite materials such as fiber reinforced plastic are preferably used as the materials.

As the thermoplastic resins, there are used polysulfones, polyether sulfones, polyimides, polyether imides, polyamides, polyether ketones, polyether ether ketones, polyethylenes, polypropylenes, poly(4-methylpentene)s, poly(vinylidene fluoride)s, ethylene-tetrafluoroethylene copolymers, polytetrafluoroethylenes, polycarbonates, acrylonitrile-butadiene-styrene copolymers (ABS resins), polyphenylene ethers, etc. As the stainless steel, SUS304, SUS316, etc. are used.

The cartridge head 12 serves not only as a fixation portion for suspending the hollow fiber membrane cartridge 4 in a module housing for a tank type filtration apparatus or a rack type filtration apparatus but also as a sealing portion for separation between raw water and filtered water. Therefore, the cartridge head 12 is produced in a shape suitable for the suspension, the fixation and the structure of a seal. For example, a level difference, a groove or a collar projecting outside in the direction of diameter may be provided at the periphery of the cartridge head 12. Suitable examples of the shape of the cartridge head are shown in FIG. 9 to FIG. 11.

Although the shape of section in the direction of diameter of the cartridge head 12 may be round, square, hexagonal, oval or the like, it is preferably round from the viewpoint of sealing properties between the cartridge head 12 and an adhesion and fixation portion therefor and ease of production of a filtration tank.

The through-holes 14a provided in the adhesion and fixation layer 14 on the bottom ring side in the present invention are holes made in the adhesion and fixation layer itself. As to the size of the through-holes, their equivalent diameter ranges preferably from 2 mm to 30 mm, in particular, from 5 mm to 25 mm. When the equivalent diameter is less than 2 mm, suspended materials in feed water adheres to the through-holes to plug them, in some cases. This tendency increases particularly in the treatment of water containing a high concentration of suspended materials, such as water to be subjected to activated sludge treatment. Therefore, the equivalent diameter is preferably adjusted to 5 mm or more. When the equivalent diameter is more than 30 mm, uniform introduction of bubbles into the whole bundle of the membranes becomes difficult, so that the efficiency of utilization of a gas tends to be decreased. Here, the equivalent diameter is defined as 4×(sectional area of flow path)/(circumference). The shape of the through-holes may be any of polygons (e.g. triangle, tetragon and hexagon), a round shape, an oval shape, a fan shape, a C shape, a star shape, etc.

Although the number of the through-holes is dependent on the sectional area of the cartridge and the number of fibers, it is approximately 2 to 300, preferably 5 to 100, more preferably 10 to 60.

As to the location of the through-holes on a certain adhesion and fixation section, the through-holes should be in the bundle of the hollow fiber membranes. When the through-holes are located outside the bundle of the membranes, contact between bubbles rising from the through-holes and the hollow fiber membranes is not sufficient, so that the efficiency of utilization of a gas supplied is decreased. As to the location of the through-holes, it is especially preferable to disperse the through-holes so that one or more hollow fiber membranes are certainly present between one of the through-hole and at least one of the other through holes. It is more preferable to form many of the through-holes in the central portion of the bundle of the hollow fiber membranes. For example, it is preferable to form the through-holes so that they are dispersed on the adhesion and fixation section at the intersections of multiplexed circles and radial lines, the intersections of lattices, or the apexes of a large number of equilateral triangles. FIG. 7 shows a case where the through-holes are radially located in the bundle of the membranes, and as to a certain through-hole, any of the hollow fiber membranes is not necessarily present between a certain pair of through-holes, but one or more of the hollow fiber membranes are present between another pair of through-holes. By providing suitable spaces among the through-holes by the location described above, suspended materials peeled off can be effectively discharged through a feed water inlet after gas bubbling, for example, in a module for rack type filtration apparatus. FIG. 8 shows a case where the through-holes are located so that one or more of the hollow fiber membranes are present between every pair of through-holes. By such location of the through-holes, the efficiency of utilization of a gas introduced can be increased, so that a necessary washing effect can be obtained even by the use of a small volume of a gas.

In the present invention, the bottom ring 13 preferably juts out beyond the ends of the hollow fiber membranes 3a to form a skirt portion, and is preferably fixed at the periphery of the bundle of the hollow fiber membranes to form a gas layer 14b surrounded by the adhesion and fixation layer and the bottom ring. Although the length of the portion of the bottom ring 13 which juts out from the ends of the hollow fiber membranes is dependent on the diameter of the cartridge, the volume of a gas supplied and the diameter and number of the through-holes, it is preferably 5 mm to 200 mm for preventing dispersion and loss of the gas. When said portion is too long, the total length of the cartridge is undesirably long, resulting in the formation of a useless space. When said portion is too short, the gas supplied to the cartridge tends to be dispersed and lost in the lateral direction without being effectively introduced into the through-holes. It is possible to open the bottom of the skirt portion and introduce a gas from below the bottom. It is also possible to join a removable lid for sealing the lower portion of the skirt portion, to the lower portion and introduce a gas into the gas layer 14b by joining a gas-supplying means directly to the lid and/or the jutting-out portion forming the skirt.

The shape of section in the direction of diameter of the bottom ring 13 may be round, square, hexagonal, oval or the like. When the cartridge is set in a filtration tank, the shape of section is preferably the same as that of the cartridge head, and a round shape is especially preferable as the shape of section.

The hollow fiber membrane cartridge of the present invention can be produced as follows. A bundle of hollow fiber membranes whose hollow portions have been stopped at one end of the bundle and pipes for connection and fixation are inserted into a cartridge head 12, and an adhesive is introduced into the cartridge head 12 to adhere and fix the hollow fiber membranes to one another and adhere and fix the pipes for connection and fixation and the bundle of the hollow fiber membranes to the cartridge head 12, so as not to permit the passage of liquid either in or out. The hollow fiber membranes and the adhesion and fixation layer are cut together to open the ends of the hollow fiber membranes.

The other ends of the hollow fiber membranes are inserted into a bottom ring together with the pipes for connection and fixation without stopping their hollow portions, and a predetermined rod, pipe or plate for forming through-holes 14a is set in the bundle of the hollow fiber membranes. Then, an adhesive is introduced into the bottom ring 13 to adhere and fix the hollow fiber membranes to one another and adhere and fix the pipes for connection and fixation and the bundle of the hollow fiber membranes to the bottom ring 13. In this case, the hollow portions at the ends of the hollow fiber membranes are sealed with the adhesive at the same time. Thereafter, the rod, pipe or plate for forming through-holes 14a is taken out of the adhesion and fixation layer to form through-holes 14a.

The following is also possible: a rod, pipe or plate for forming through-holes 14a is set in the bundle of the hollow fiber membranes, followed by adhesion and fixation, and the instrument for forming through-holes 14a is taken out, after which a bottom ring 13 is fixed at the periphery of the adhesion and fixation layer by adhesion or welding.

An example of tank type filtration apparatus (FIG. 1) comprising the hollow fiber membrane cartridges of the present invention suspended and fixed therein is explained below.

In FIG. 1, numeral 1 denotes a tank type filtration apparatus for filtering raw water fed, which can be used for water treatment in reducing turbidity and bacteria from a large volume of raw water such as river water, lake water, underground water, sea water, life waste water or industrial waste water.

The filtration tank 2 of the tank type filtration apparatus 1 is composed of a tank main body 2a and a lid 2b, and a partition plate 6 is fixed on the inner wall of the tank main body 2a at a predetermined height by welding or the like so as not to permit the passage of liquid either in or out. A feed water chamber 7 is formed of a space formed by the tank main body 2a and the partition plate 6. A treated water chamber 10 is formed by the partition plate 6, the lid 2b and a packing 9.

As described above, the inside of the filtration tank 2 is divided into the two chambers by the partition plate 6 fixed in the filtration tank 2, and each hollow fiber membrane cartridge 4 of the present invention is suspended in the feed water chamber 7 with its one end held by the partition plate 6.

The partition plate 6 holding the hollow fiber membrane cartridge 4 suspended therefrom is made in a predetermined thickness so as to have a sufficient strength to withstand a load applied by the hollow fiber membrane cartridge and water pressure. A plurality of through-holes 6a for inserting the hollow fiber membrane cartridges 4 are formed at predetermined positions of the partition plate 6.

In the lower portion of each through-hole 6a of the partition plate 6, a projection 6b jutting inside the through-hole 6a in the direction of the diameter is formed, and the lower end of the cartridge head 12 provided at the periphery at the upper end of the hollow fiber membrane cartridge 4 is caught by the projection 6b to suspend and hold the hollow fiber membrane cartridge 4. As another embodiment, the following is possible: a collar jutting outside-in the direction of diameter is formed on the cartridge head, and its underside is brought into contact with the top surface of the partition plate 6 through a gasket to suspend and hold the hollow fiber membrane cartridge.

An O-ring 15 is fitted in a groove 6c formed on the wall surface of each through-hole 6a of the partition plate 6, and the outer wall surface of the cartridge head 12 is bonded to the O-ring 15 by pressure welding, whereby the cartridge head 12 is attached to the partition plate 6 so as not to permit the passage of liquid either in or out. A groove for fitting the O-ring 15 therein may be formed on the cartridge head 12.

The upper edge face of the cartridge head 12 is moored by a mooring member 16 which has been provided on the wall surface of each through-hole 6a of the partition plate 6 so as to be removable, whereby the cartridge head 12 is fixed to the partition plate 6 and the hollow fiber membrane cartridge 4 is stably accommodated in the filtration tank 2.

In the above structure, during filtration operation using the tank type filtration apparatus 1, raw water fed into the feed water chamber 7 through a feed water inlet 2c provided in the lower portion of the tank main body 2a of the filtration tank 2 by means of a pump (not shown) fills up the feed water chamber 7 and is then conducted to the peripheral surface of each hollow fiber membrane 3a.

The raw water near the periphery of each hollow fiber membrane 3a is filtered under pressure through the hollow fiber membrane 3a from the outside to the inside, and the filtered water is introduced into the treated water chamber 10 through the opened upper end of the hollow fiber membrane 3a. The filtered water accommodated in the treated water chamber 10 is taken out of the filtration tank 2 through a treated water outlet 2d provided in the upper portion of the lid 2b.

As another operation method, a method can be adopted which comprises carrying out filtration by sucking air in the treated water chamber 10 through the treated water outlet 2d by means of a suction pump (not shown) to reduce the pressure, while filling the feed water chamber 7 with raw water.

When the hollow fiber membranes 3a are subjected to back washing with the filtered water, the filtered water is supplied through the treated water outlet 2d and allowed to flow backward into the feed water chamber 7 to remove suspended materials (materials incapable of permeating the membranes) accumulated on the outer walls of the hollow fiber membranes 3a, after which it is discharged from the filtration tank 2 through the feed water inlet 2c.

When the hollow fiber membranes 3a are subjected to gas bubbling, a gas is supplied at first to the feed water chamber 7 through a gas inlet 2f provided in the lower portion of the tank main body 2a, with the feed water chamber 7 filled with raw water. The gas flows as bubbles into the feed water chamber 7 filled with the raw water, through a nozzle 5a, and passes through each bottom ring 13 and then the through-holes 14a of the adhesion and fixation layer 14 to vibrate the hollow fiber membranes 3a. Thus, the gas peels off the suspended materials adhering to the surfaces of the hollow fiber membranes 3a. Gas accumulated in the upper portion of the feed water chamber 7 is discharged from the filtration tank 2 through a gas outlet 2g provided in the upper portion of the tank main body 2a. In the above-mentioned gas bubbling, since the adhesion and fixation layer 11 on the cartridge head side and the adhesion and fixation layer 14 on the bottom ring side are connected and fixed to each other by means of a stainless steel pipe 3b in the hollow fiber membrane cartridge 4, the bottom ring 13 is neither lifted nor displaced from a position corresponding to the nozzle 5a irrespective of the flow rate of the gas, so that satisfactory washing can be carried out.

In the above gas bubbling operation, for example, air, nitrogen gas or oxygen gas is supplied at first, with the feed water chamber 7 filled with the raw water, namely, with the raw water being at rest and staying in the feed water chamber 7. After gas bubbling, the above-mentioned back washing operation is carried out to wash away the suspended materials peeled off as described above, with filtered water supplied through the treated water outlet 2d. The filtered water containing the suspended materials peeled off is discharged from the filtration tank 2 through the feed water inlet 2c and accommodated in a waste water tank (not shown).

Either the gas bubbling operation or the back washing operation may be carried out first. They may also be carried out at the same time. When the back washing and the gas bubbling are carried out at the same time, rubbing of the surfaces of the membranes, which is apt to accompany the vibration of the hollow fiber membranes, can be desirably prevented. The frequencies of the above-mentioned back washing operation and gas bubbling operation are preferably determined while monitoring the stability of the filtration operation.

Next, an example of tank type filtration apparatus (FIG. 4) comprising the hollow fiber membrane cartridges suspended from and fixed to a treated water header piping is explained below.

Figure 4:
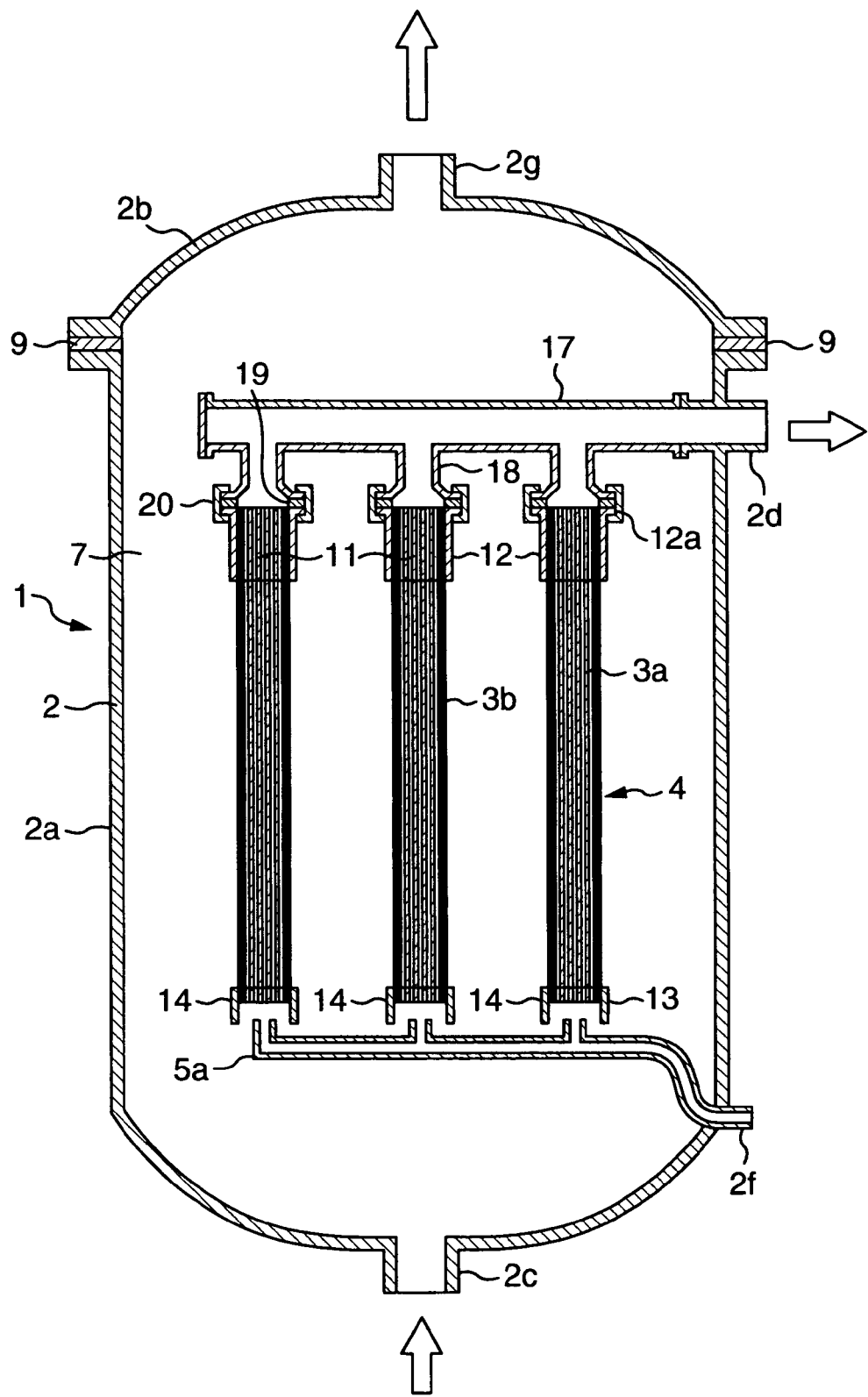
FIG. 4 is a sectional illustration showing one embodiment of the hollow fiber membrane cartridge of the present invention fixed by suspension from a treated water header piping in a tank type filtration apparatus.

In FIG. 4, each hollow fiber membrane cartridge 4 is suspended from and fixed to a branch pipe 18 branched from a treated water header piping 17, by the use of a cartridge head collar 12a provided at the periphery of the cartridge head 12 and a cramp 20 through a gasket 19.

In the above structure, during filtration operation using the tank type filtration apparatus 1, raw water fed into a feed water chamber 7 through a feed water inlet 2c provided in the lower portion of the tank main body 2a of a filtration tank 2 by means of a pump (not shown) fills up the feed water chamber 7 and is then conducted to the peripheral surface of each hollow fiber membrane 3a. The raw water near the periphery of each hollow fiber membrane 3a is filtered under pressure through the hollow fiber membrane 3a from the outside to the inside, and the filtered water is introduced into the treated water header piping 17 through the opened upper end of the hollow fiber membrane 3a and the branch pipe 18. The filtered water in the treated water header piping is discharged from the filtration tank 2 through a treated water outlet 2d provided in the tank main body 2a.

The concentrated water not filtered through the hollow fiber membranes 3a is discharged from the filtration tank 2 through the concentrated water outlet 2g of a lid 2b provided in the upper portion of the filtration tank 2.

When the hollow fiber membranes 3a are subjected to back washing with the filtered water, the filtered water is supplied through the treated water outlet 2d and allowed to flow backward into the feed water chamber 7 to remove suspended materials (materials incapable of permeating the membranes) accumulated on the outer walls of the hollow fiber membranes 3a, after which it is discharged from the filtration tank 2 through the concentrated water outlet 2g.

When the hollow fiber membrane cartridges 4 are subjected to gas bubbling, a gas is supplied at first to the feed water chamber 7 through a gas inlet 2f provided in the lower portion of the tank main body 2a, with the feed water chamber 7 filled with raw water. The gas flows as bubbles into the feed water chamber 7 through a nozzle 5a and is conducted to the side of the periphery of each hollow fiber membrane 3a from the bottom ring 13 through the through-holes 14a of the adhesion and fixation layer 14 to stir water in the bundle of the hollow fiber membranes 3a and vibrate the hollow fiber membranes 3a. Thus, the gas peels off the suspended materials adhering to the surfaces of the hollow fiber membranes 3a. The gas that has vibrated the hollow fiber membranes 3a is discharged from the filtration tank 2 through the concentrated water outlet 2g provided in the lid 2b.

Either the above-mentioned gas bubbling operation or the above-mentioned back washing operation may be carried out first. They may also be carried out at the same time. When the back washing and the gas bubbling are carried out at the same time, rubbing of the surfaces of the membranes, which is apt to accompany the vibration of the hollow fiber membranes, can be desirably prevented. The frequencies of the above-mentioned back washing operation and gas bubbling operation are preferably determined while monitoring the stability of the filtration operation.

In the above-mentioned gas bubbling, since the adhesion and fixation layer 11 on the cartridge head side and the adhesion and fixation layer 14 on the bottom ring side are connected and fixed to each other by means of a SUS pipe 3b in the hollow fiber membrane cartridge 4, the bottom ring 13 is neither lifted nor displaced from a position corresponding to the nozzle 5a irrespective of the flow rate of the gas, so that satisfactory washing can be carried out.

Next, an example of module for rack type filtration apparatus (FIGS. 5 and 6) comprising the hollow fiber membrane cartridge of the present invention suspended and fixed therein is explained below. The term "module" used herein means an assembly comprising a housing having at least a feed water inlet and an open-ended portion provided in the upper portion of the housing and a hollow fiber membrane cartridge, wherein the hollow fiber membrane cartridge is inserted in the housing and fixed to the open-ended portion in the upper portion of the housing so as to be removable and so as not to permit the passage of liquid either in or out.

The housing 21a has the feed water inlet 2c in the lower portion and a housing head 21b fitted with a concentrated water nozzle 22, in the upper portion. The housing head has a double-pipe structure in which the inner wall of the housing head has head openings that communicate with the concentrated water nozzle 22 through a space formed inside the outer wall by the inner wall and the outer wall. The cartridge is accommodated inside the inner wall.

The hollow fiber membrane cartridge of the present invention is inserted into the housing from above and fixed to the upper end of the housing head by means of the collar 12a of the cartridge through a gasket or an O-ring so as not to permit the passage of liquid either in or out. The collar 12a of the cartridge and a cap having a treated water outlet 2d are fixed to each other through an O-ring 25 so as not to permit the passage of liquid either in or out. The housing head 21b, the collar 12a and the cap 24 are integrally fixed by means of a housing nut 23.

In the above structure, during filtration operation using a rack type filtration apparatus, raw water fed into the housing 21a through a feed water piping (not shown) and the feed water inlet 2c by means of a pump fills to the bottom ring 13 and is then conducted to the peripheral surface of each hollow fiber membrane 3a through the through-holes 14a.

The raw water near the periphery of each hollow fiber membrane 3a is filtered under pressure through the hollow fiber membrane 3a from the outside to the inside, and the filtered water is introduced into the cap 24 through the opened upper end of the hollow fiber membrane 3a. The filtered water introduced into the cap 24 is taken out of the rack type apparatus through the filtered water piping (not shown) of the rack type apparatus and a treated water outlet 2d. The raw water conducted to the peripheral surface of each hollow fiber membrane 3a can be partly conducted to the concentrated water nozzle 22 through the head openings 27 to be returned to the circulation tank or raw water tank (not shown) of the apparatus through a concentrated water outlet 2g.

When the hollow fiber membranes 3a are subjected to back washing with the filtered water, the filtered water is supplied through the treated water outlet 2d and allowed to flow backward into the housing 21a to remove suspended materials (materials incapable of permeating the membranes) accumulated on the outer walls of the hollow fiber membranes 3a, after which it is discharged from the housing 21a through the head openings 27 and the concentrated water nozzle 22. It is also possible to discharge the water containing the suspended materials which has been obtained by the washing with the filtered water allowed to flow backward, through the through-holes 14a present in the bottom ring 13 and the feed water outlet 2c in the lower portion.

When the hollow fiber membranes 3a are subjected to gas bubbling, a gas is supplied at first to the bottom ring 13 through a gas inlet (not shown) provided in a piping connected to the feed water inlet 2c from below, with the housing 21a filled with raw water or the filtered water. The gas supplied passes through the through-holes 14a of the adhesion and fixation layer 14 while staying in the skirt portion provided in the lower portion of the bottom ring 13, to vibrate the hollow fiber membranes 3a. Thus, the gas peels off the suspended materials adhering to the surfaces of the hollow fiber membranes 3a. It is also possible to carry out the above-mentioned back washing simultaneously with the gas bubbling and discharge the washings from the housing through the concentrated water nozzle 22. In this case, rubbing of the surfaces of the membranes, which is apt to accompany the vibration of the hollow fiber membranes, can be desirably prevented.

Then, flushing may be carried out if necessary. The term "flushing" used here means a step of discharging the suspended materials peeled off by the above-mentioned gas bubbling, from the housing. The flushing is usually carried out by introducing raw water through the feed water inlet 2c and discharging the same through the concentrated water nozzle 22.

In the above-mentioned gas bubbling, since the adhesion and fixation layer 11 on the cartridge head side and the adhesion and fixation layer 14 on the bottom ring side are connected and fixed to each other by means of a stainless steel pipe 3b in the hollow fiber membrane cartridge 4, the bottom ring 13 is not lifted irrespective of the flow rate of the gas, so that satisfactory washing can be carried out.

Specific examples concerning the cartridge of the present invention are described below.

Hollow Fiber Membrane A

In a Henschel mixer, 23 wt % of hydrophobic silica having an average primary-particle size of 0.016 μm and a specific surface area of 110 m²/g (Aerosil R-970, a trade name, mfd. by Nippon Aerosil Co., Ltd.), 30.8 wt % of dioctyl phthalate and 6.2 wt % of dibutyl phthalate were mixed, followed by adding thereto 40 wt % of PVdF having a weight average molecular weight of 242,000 (Kureha KF Polymer #1000, a trade name, mfd. by Kureha Chemical Industry Co., Ltd.), and they were mixed again in the Henschel mixer.

The resulting mixture was shaped into hollow fibers by melt-extruding the mixture into a water bath at 40° C. through the air at a rate of 20 m/min by using a hollow-fiber producing apparatus obtained by fitting a hollow-fiber-shaped spinning hole to a 30-mmφ twin-screw extruder. The shaped product was continuously taken off at a rate of 20 m/min with a sponge belt type take-off machine having variable gaps, passed through a heating bath controlled at a space temperature of 40° C., and then taken off at a rate of 40 m/min with the same take-off machine as above to be stretched at a ratio of 2.0. The resulting hollow fiber membranes were passed through a heating bath controlled at a space temperature of 80° C., and cooled by their continuous holding between a pair of uneven rolls located on the surface of water in a cooling water bath, after which the stretched fibers were taken off at a rate of 30 m/min with a sponge belt type take-off machine to be shrunk to 1.5 times the original length of the hollow fibers, and were wound up as a hank.

Subsequently, the immersion of the wound-up hollow fiber membranes in methylene chloride at 30° C. for 1 hour was repeated three times to extract dioctyl phthalate and dibutyl phthalate from the membranes, and then the membranes were dried. Thereafter, the hollow fiber membranes were immersed in a 50% aqueous ethanol solution for 30 minutes and then in water for 30 minutes to be wetted with water, after which their immersion in a 5% aqueous sodium hydroxide solution at 40° C. for 1 hour was repeated twice to extract hydrophobic silica from the membranes, and the membranes thus treated were washed with warm water at 60° C. for 12 hours and then dried.

The hollow fiber membranes thus obtained had an outside diameter of 1.25 mm, an inside diameter of 0.65 mm, a permeability to pure water of 6,000 liters/m²/hour/0.1 MPa, a modulus in tension of 19.6 MPa, and a degree of crimping of 1.68.

Hollow Fiber Membrane B

The above-mentioned hollow fiber membranes A were heat-treated in an oven at 140° C. for 2 hours. The resulting hollow-fiber membranes had an outside diameter of 1.24 mm, an inside diameter of 0.65 mm, a permeability to pure water of 5,300 liters/m²/hour/0.1 MPa, a modulus in tension of 40.2 MPa, and a degree of crimping of 1.72.

Hollow Fiber Membrane C

By the process described in International Publication Number WO00/63122, the hollow fiber membranes made of PVdf of Example 1 in this reference were produced. These hollow fiber membranes had a modulus in tension of 77.3 MPa and waves corresponding to a degree of crimping of 1.74.

Hollow Fiber Membrane D

By the process described in International Publication Number WO97/03677, the hollow fiber membranes made of a polysulfone of Example 1 in this reference were produced. These hollow fiber membranes had a modulus in tension of 100 MPa, were straight without a wave and had a degree of crimping of 1.45.

Hollow Fiber Membrane E

By the process described in JP-A-03-42025, the hollow fiber membranes made of a polyethylene of Example 1 in this reference were produced. These hollow fiber membranes had a modulus in tension of 50 MPa, were straight without waves and had a degree of crimping of 1.47.

EXAMPLE 1

Using 6,400 of the above-mentioned hollow fiber membranes B, a cartridge was produced which was composed of the cartridge head having a flat type collar and shown in FIG. 10, the bottom ring having twenty-six 11-mmφ through-holes and a projection with a length of 40 mm and shown in FIG. 8, and two stainless steel pipes with an outside diameter of 10 mm and a thickness of 1 mm. The pipes were located at outermost positions in a bundle of the hollow fiber membranes as shown in FIG. 8 and were adhered and fixed to the hollow fiber membranes by the use of a two-pack thermosetting urethane resin (SA-6330A2/SA-6330B5, a trade name, mfd. by SUNYURECK). The cartridge head and the bottom ring were those made of ABS, and the adhesive used had Shore hardness values at 5° C. and 40° C. of 65D and 40D, respectively.

The outside diameters of the cartridge head and the bottom ring were 167 mm and 150 mm, respectively. The adhesive thicknesses in the cartridge head and the bottom ring were 65 mm and 30 mm, respectively. The effective length of the hollow fiber membranes was 2,010 mm and the rate of slacking of the membranes was 4%.

The cartridge could easily be carried by holding the two pipes.

Figure 5:
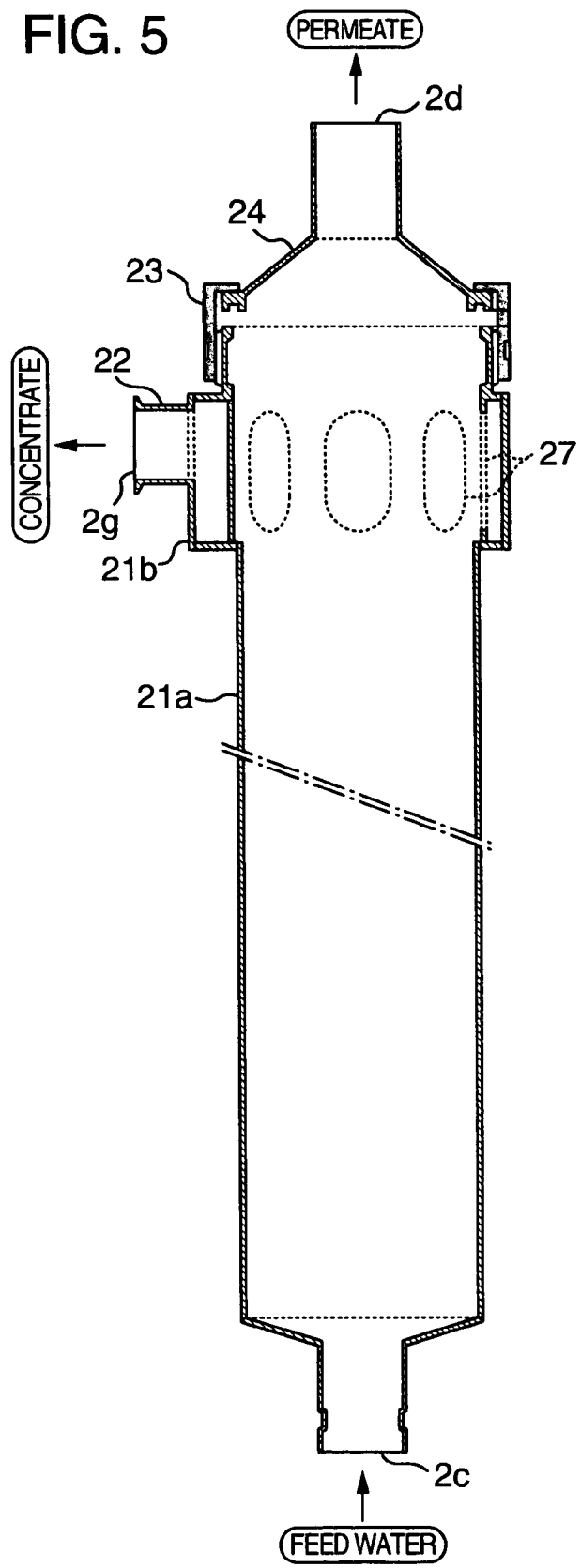
FIG. 5 is a sectional illustration showing one embodiment of a housing constituting a module used in a rack type filtration apparatus.

The cartridge was accommodated in the housing shown in FIG. 5, and a cap was joined to the cartridge and the housing by the use of a housing nut. In the joining, as shown in FIG. 10, the cap was fixed with two O-rings inserted between the housing and cap and the cartridge head, so as not to permit the passage of liquid either in or out.

The module described above was set in a rack type apparatus and a filtration test using water of the Fuji River as raw water was carried out. The operation conditions are described below.

Volume of water filtered: 2.7 $m^3/m^2$/day.

Volume of water concentrated: one-half the volume of water filtered.

Volume of water used for back washing: 1.5 times the volume of water filtered.

Gas (air) flow rate: 0.3 ml/sec/fiber membrane

Volume of water used for flushing: 2 $m^3$/hour.

Operation cycle: filtration 28.5 min.–back washing/gas bubbling (at the same time) 1 min.–flushing 0.5 min.

In the back washing, water for back washing was supplied after adding sodium hypochlorite thereto in a proportion of 4 mg/liter.

During the operation, the trans membrane pressure (in terms of its value at 20° C.; the same applied in the other examples) after the back washing increased gradually and reached 40 kPa 48 hours after the back washing. Thereafter, it became stable and was 40 to 45 kPa even 1,000 hours after the back washing.

The water temperature during the operation was 8° C. to 13° C., and the average turbidity was 3 ppm.

After 1,000 hours of the operation, the cartridge was taken out and the hollow fiber membranes and the adhesion and fixation portions of the cartridge were observed to find that there was no abnormality in them.

EXAMPLE 2

A cartridge was produced in the same manner as in Example 1 except for using hollow fiber membranes C and the cartridge head having a ferrule type collar and shown in FIG. 9. The rate of slacking of the hollow fiber membranes in the cartridge was 2%.

The hollow fiber membrane cartridge was set in the tank type apparatus shown in FIG. 4 and a filtration experiment was carried out. The operation conditions are described below.

Volume of water filtered: 2.4 $m^3/m^2$/day.

Volume of water concentrated: one-half the volume of water filtered.

Volume of water used for back washing: 1.5 times the volume of water filtered.

Gas (air) flow rate: 0.3 ml/sec/fiber membrane

Volume of water used for flushing: 3 $m^3$/hour.

Operation cycle: filtration 28 min.–back washing/gas bubbling (at the same time) 1 min.–flushing 1 min.

In the back washing, water for back washing was supplied after adding sodium hypochlorite thereto in a proportion of 4 mg/liter.

During the operation, the trans membrane pressure after the back washing increased gradually and reached 60 kPa 48 hours after the back washing. Thereafter, it became stable and was 65 to 70 kPa even 1,000 hours after the back washing.

The water temperature during the operation was 12° C. to 16° C., and the average turbidity was 3 ppm.

After 1,000 hours of the operation, the cartridge was taken out and the hollow fiber membranes and the adhesion and fixation portions of the cartridge were observed to find that there was no abnormality in them.

EXAMPLE 3

A cartridge was produced in the same manner as in Example 1 except for using hollow fiber membranes A, the cartridge head having a ferrule type collar and shown in FIG. 9, and four 10-mm$\phi$ fiber reinforced plastic round rods. The round rods were located at the outermost positions, respectively, corresponding to one-fourth the circumference of a bundle of the hollow fiber membranes. The rate of slacking of the hollow fiber membranes in the cartridge was 5%.

The cartridge could easily be carried by holding two of the round rods which faced each other.

A filtration experiment using a tank type filtration apparatus was carried out in the same manner as in Example 2.

During the operation, the trans membrane pressure after the back washing increased gradually and reached 40 kPa 48 hours after the back washing. Thereafter, it became stable and was 40 to 45 kPa even 1,000 hours after the back washing.

The water temperature during the operation was 14° C. to 18° C., and the average turbidity was 3 ppm.

After 1,000 hours of the operation, the cartridge was taken out and the hollow fiber membranes and the adhesion and fixation portions of the cartridge were observed to find that there was no abnormality in them.

EXAMPLE 4

A cartridge was produced in the same manner as in Example 1 except for using the cartridge head having a thread and shown in FIG. 11, changing the length of the projection of the bottom ring to 100 mm, and using a two-pack thermosetting urethane resin (SA-6330A2/SA-6330B4, a trade name, mfd. by SUNYU REC Co., Ltd.) as an adhesive. This adhesive had Shore hardness values at 5° C. and 40° C. of 52D and 35D, respectively. The rate of slaking of the hollow fiber membranes in the cartridge was 4%.

Suction filtration was carried out by connecting the hollow fiber membrane cartridge to a piping as shown in FIG. 11 and immersing the same in a raw-water tank. In the projection of the bottom ring of the cartridge, a through-hole was provided at a distance of 10 mm from the lower end of the projection, and a nozzle for air supply was inserted into this through-hole and fixed, so that air could be supplied to the inside of the skirt. The operation conditions are described below.

Volume of water filtered: 2.7 $m^3/m^2$/day.

Volume of water used for back washing: 1.5 times the volume of water filtered.

Gas (air) flow rate: 0.3 ml/sec/fiber membrane

Operation cycle: filtration 18 min.–back washing/gas bubbling (at the same time) 1 min.–drainage 0.5 min.–raw water feed 0.5 min.

(That is, in the cycle, filtration was carried out for a predetermined time, and then back washing and gas bubbling were carried out at the same time, after which the liquid in the raw-water tank was discharged from the tank, and raw water was fed to the raw-water tank to fill up the tank, followed by the start of filtration.)

During the filtration, raw water was continuously fed to the raw-water tank in the same volume as that of water filtered. In the back washing, water for back washing was supplied after adding sodium hypochlorite thereto in a proportion of 4 mg/liter.

During the operation, the amount of reduced pressure by suction after the back washing increased gradually and reached 50 kPa 48 hours after the back washing. Thereafter, it became stable and was 50 to 55 kPa even 1,000 hours after the back washing.

The water temperature during the operation was 12° C. to 16° C., and the average turbidity was 5 ppm.

After 1,000 hours of the operation, the cartridge was taken out and the hollow fiber membranes and the adhesion and fixation portions of the cartridge were observed to find that there was no abnormality in them.

EXAMPLE 5

A cartridge was produced in the same manner as in Example 4 except for locating two hundreds (200) 3-mmϕ-through-holes uniformly in the bundle of the hollow fiber membranes in the bottom ring. The rate of slacking of the hollow fiber membranes in the cartridge was 4%.

A filtration experiment was carried out in the same manner as in Example 4. The water temperature during the operation was 12° C. to 16° C., and the average turbidity was 5 ppm.

During the operation, the amount of reduced pressure by suction after the back washing increased gradually and reached 50 kPa 48 hours after the back washing. Thereafter, it became stable and was 55 kPa 500 hours after the back washing. Then, it tended to increase gradually but was 65 kPa even 1,000 hours after the back washing.

After 1,000 hours of the operation, the cartridge was taken out and the hollow fiber membranes and the adhesion and fixation portions of the cartridge were observed to find that there was no particular abnormality in them.

EXAMPLE 6

A cartridge was produced in the same manner as in Example 2 except for changing the outside diameters of the cartridge head and the bottom ring to 90 mm and 78 mm, respectively, changing the adhesive thicknesses in the cartridge head and the bottom ring to 30 mm and 20 mm, respectively, using 1,600 hollow fiber membranes B, and using a two-pack thermosetting urethane resin (KC-374/KN-575, a trade name, mfd. by Nippon Polyurethane Industry Co., Ltd.) as an adhesive. Six through-holes were located at positions that were 19 mm apart from the center of the bottom ring and corresponded to one-sixth the circumference of the bottom ring. The adhesive had Shore hardness values at 5° C. and 40° C. of 50D and 38D, respectively. The effective length of the hollow fiber membranes in the cartridge was 940 mm and the rate of slaking of the hollow fiber membranes in the cartridge was 3%.

The hollow fiber membrane cartridge was set in the tank type apparatus shown in FIG. 4 and a filtration experiment was carried out. The operation conditions are described below.

Volume of water filtered: 2.4 m³/m²/day.
Volume of water concentrated: one-half the volume of water filtered.
Volume of water used for back washing: 1.5 times the volume of water filtered.
Gas (air) flow rate: 0.2 ml/sec/fiber membrane
Volume of water used for flushing: 0.7 m³/hour.

Operation cycle: filtration 28 min.–back washing/gas bubbling (at the same time) 1 min.–flushing 1 min.

In the back washing, water for back washing was supplied after adding sodium hypochlorite thereto in a proportion of 4 mg/liter.

During the operation, the trans membrane pressure after the back washing increased gradually and reached 50 kPa 48 hours after the back washing. Thereafter, it became stable and was 55 to 60 kPa even 1,000 hours after the back washing.

The water temperature during the operation was 12° C. to 16° C., and the average turbidity was 3 ppm.

After 1,000 hours of the operation, the cartridge was taken out and the hollow fiber membranes and the adhesion and fixation portions of the cartridge were observed to find that there was no abnormality in them.

EXAMPLE 7

A cartridge was produced in the same manner as in Example 6 except for using hollow fiber membranes D. The rate of slacking of the hollow fiber membranes in the cartridge was 0.5%.

A filtration experiment was carried out in the same manner as in Example 6.

During the operation, the trans membrane pressure after the back washing increased gradually and reached 40 kPa 48 hours after the back washing. Thereafter, it increased gradually and reached 90 kPa 500 hours the back washing and then 140 kPa 1,000 hours after the back washing.

The water temperature during the operation was 12° C. to 16° C., and the average turbidity was 3 ppm.

After 1,000 hours of the operation, the cartridge was taken out and the hollow fiber membranes and the adhesion and fixation portions of the cartridge were observed to find that there was no abnormality in them.

EXAMPLE 8

A cartridge was produced in the same manner as in Example 1 except for using hollow fiber membranes E. The rate of slacking of the hollow fiber membranes in the cartridge was 3%.

A filtration experiment was carried out in the same manner as in Example 1.

During the operation, the trans membrane pressure after the back washing increased and reached 80 kPa 48 hours after the back washing. Thereafter, it increased gradually and reached only 100 kPa 500 hours after the back washing and then only 130 kPa 1,000 hours after the back washing.

The water temperature during the operation was 12° C. to 10° C., and the average turbidity was 3 ppm.

After 1,000 hours of the operation, the cartridge was taken out and the hollow fiber membranes and the adhesion and fixation portions of the cartridge were observed to find that there was no abnormality in them.

EXAMPLE 9

A cartridge was produced in the same manner as in Example 1, and an acceleration test for evaluating the durability of the cartridge in gas bubbling was carried out. The same operation cycle as in Example 1 was employed except for changing the filtration time in the filtration operation in Example 1 to 2 minutes. The operation was carried out in a closed system by returning filtered water, concentrated water and washing water for back washing to a raw-water tank. The water temperature in the system was maintained at 5° C. by cooling on the assumption that the operation is carried out in the low-water-temperature season.

After repeating a cycle consisting of filtration, back washing/gas bubbling and flushing for a period corresponding to 5 years in the case of employing the operation cycle described in Example 1, the cartridge was taken out and observed to find that there was no abnormality in the hollow fiber membranes, the adhesion and fixation portions of the cartridge head, and the like.

COMPARATIVE EXAMPLE 1

A cartridge was produced in the same manner as in Example 2 except for employing the bottom ring structure shown in FIG. 4 and FIG. 6 in JP-A-10-137552, locating a 25-mmφ PVC pipe in the center of the cartridge and using hollow fiber membranes D. The through-holes of the bottom ring are open at a distance of 5 mm from the PVC pipe located in the center and had a width of 10 mm. The area occupied by a bundle of the hollow fiber membranes was the same as in Example 2. The rate of slacking of the hollow fiber membranes in the cartridge was 0.5%.

Since the middle of the cartridge could not be held, two persons unavoidably carried the cartridge by holding the cartridge head and the bottom ring, respectively.

When the same filtration test as in Example 2 was carried out by using said cartridge, the intermembranous differential pressure after the back washing increased rapidly and reached 300 kPa 400 hours after the back washing, so that the operation was unavoidably discontinued.

COMPARATIVE EXAMPLE 2

A cartridge was produced in the same manner as in Example 1 except for using a two-pack thermosetting urethane resin (Coronate-4403/Nipporan-4221, a trade name, mfd. by Nippon Polyurethane Industry Co., Ltd.) as an adhesive. The adhesive had Shore hardness values at 5° C. and 40° C. of 72D and 28D, respectively.

An acceleration test for evaluating the durability of the cartridge in gas bubbling was carried out in the same manner as in Example 9 to find that the hollow fiber membranes were broken at their adhesive interfaces to cause leakage, at a point of time corresponding to one year of repetition of the operation cycle described in Example 1.

INDUSTRIAL APPLICABILITY

The present inventive cartridge, module for rack type filtration apparatus using said cartridge, and tank type filtration apparatus using said cartridge permit long-term stable filtration operation because they maximize the extension and/or vibration of each hollow fiber membrane during washing by gas bubbling to facilitate peeling-off of suspended materials accumulated on the outer surfaces of the hollow fiber membranes, even by introduction of a small volume of a gas, and permit easy discharge of the peeled-off suspended materials from the hollow fiber membrane cartridge. Furthermore, the cartridge of the present invention is very useful for practical purposes because it has a sufficient durability for practical purposes and it is easy to handle, for example, when carried. The module for filtration apparatus and the tank type filtration apparatus which use said cartridge are economical because a housing or a tank, respectively, can be repeatedly used therein even when the cartridge is replaced by a fresh one.

The invention claimed is:

1. A hollow fiber membrane cartridge that uses hollow fiber membranes and which is set in a tank type filtration apparatus, a rack type filtration apparatus or an immersion type filtration apparatus, in which filtration is carried out under a pressure or suction, comprising a bundle of a plurality of hollow fiber membranes, both ends of which are fixed by adhesion in adhesion and fixation layers, respectively, a cartridge head fixed at periphery of the bundle at one end so as not to permit passage of liquid either in or out, and a bottom ring fixed at periphery of the bundle at the other end so as not to permit passage of liquid either in or out, which is characterized in that said cartridge head and said bottom ring are connected and fixed to a plurality of rods or pipes and the rods or pipes being located so that the hollow fiber membranes can be exposed substantially throughout a range between the cartridge head and the ring bottom, wherein at least one of said rods or pipes is located near the periphery of the bundle of the hollow fiber membranes, each hollow fiber membrane is made of a poly (vinylidene fluoride) having a modulus in tension of not more than 60 Mpa and not less than 10 Mpa, the hollow portion at the end of each hollow fiber membrane on the cartridge head side is open, the hollow portion at the end of each hollow fiber membrane on the bottom ring side is sealed, and a plurality of through-holes are provided in the adhesion and fixation layer on the bottom ring side and are located in the bundle of the hollow fiber membranes.

2. A hollow fiber membrane cartridge that uses hollow fiber membranes and which is set in a tank type filtration apparatus, a rack type filtration apparatus or an immersion type filtration apparatus, in which filtration is carried out under a pressure or suction, according to claim 1, wherein the end of said bottom ring juts out beyond the ends of the hollow fiber membranes.

3. A hollow fiber membrane cartridge that uses hollow fiber membranes and which is set in a tank type filtration apparatus, a rack type filtration apparatus or an immersion type filtration apparatus, in which filtration is carried out under a pressure or suction, according to claim 1 or claim 2, wherein said cartridge head has a collar at its periphery.

4. A hollow fiber membrane cartridge that uses hollow fiber membranes and which is set in a tank type filtration apparatus, a rack type filtration apparatus or an immersion type filtration apparatus, in which filtration is carried out under a pressure or suction, according to claim 1, wherein said rods or pipes are connected and fixed to said cartridge head and said bottom ring by adhesion to them together with the hollow fiber membranes in the adhesion and fixation layers.

5. A hollow fiber membrane cartridge that uses hollow fiber membranes and which is set in a tank type filtration apparatus, a rack type filtration apparatus or an immersion type filtration apparatus, in which filtration is carried out under a pressure or suction, according to claim 1, wherein the hollow fiber membranes have waves.

6. A hollow fiber membrane cartridge that uses hollow fiber membranes and which is set in a tank type filtration apparatus, a rack type filtration apparatus or an immersion type filtration apparatus, in which filtration is carried out under a pressure or suction, according to claim 1, wherein the hollow fiber membranes are in a slacked state and the rate of slacking is not more than 10% and not less than 0.1%.

7. A hollow fiber membrane cartridge that uses hollow fiber membranes and which is set in a tank type filtration apparatus, a rack type filtration apparatus or an immersion type filtration apparatus, in which filtration is carried out under a pressure or suction, according to claim 1, wherein the plurality of said through-holes provided in the adhesion and fixation layer on the bottom ring side are located so that the hollow fiber membranes are present among the through-holes.

8. A hollow fiber membrane cartridge that uses hollow fiber membranes and which is set in a tank type filtration apparatus, a rack type filtration apparatus or an immersion type filtration apparatus, in which filtration is carried out under a pressure or suction, according to claim 1, wherein said plurality of through-holes provided in the adhesion and fixation layer on the bottom ring side have an inside diameter of 2 to 30 mm.

9. A hollow fiber membrane cartridge that uses hollow fiber membranes and which is set in a tank type filtration apparatus, a rack type filtration apparatus or an immersion type filtration apparatus, in which filtration is carried out under a pressure or suction, according to claim 1, wherein an adhesive constituting said adhesion and fixation layers is a urethane resin having such a characteristic that its hardness is 70D to 30D in a working temperature range.

10. A module for rack type filtration apparatus using a hollow fiber membrane cartridge according to claim 1.

11. A tank type filtration apparatus using a hollow fiber membrane cartridge according to claim 1.

12. A tank type filtration apparatus according to claim 11, wherein said hollow fiber membrane cartridge is supported in a suspended state.

13. A hollow fiber membrane cartridge that uses hollow fiber membranes and which is set in a tank type filtration apparatus, a rack type filtration apparatus or an immersion type filtration apparatus, in which filtration is carried out under a pressure or suction, comprising a bundle of a plurality of hollow fiber membranes, both ends of which are fixed by adhesion in adhesion and fixation layers, respectively, a cartridge head fixed at periphery of the bundle at one end so as not to permit passage of liquid either in or out, and a bottom ring fixed at periphery of the bundle at the other end so as not to permit passage of liquid either in or out, which is characterized in that said cartridge head and said bottom ring are connected and fixed to a plurality of rods or pipes, wherein the rods or pipes are located so as to be dispersed in the bundle of hollow fiber membranes, each hollow fiber membrane is made of a poly(vinylidene fluoride) having a modulus in tension of not more than 60 Mpa and not less than 10 Mpa, the hollow portion at the end of each hollow fiber membrane on the cartridge head side is open, the hollow portion at the end of each hollow fiber membrane on the bottom ring side is sealed, and a plurality of through-holes are provided in the adhesion and fixation layer on the bottom ring side and are located in the bundle of the hollow fiber membranes.

* * * * *